United States Patent [19]

King

[11] 3,719,598

[45] March 6, 1973

[54] AQUEOUS CUTTING FLUID WHICH PROTECTS FERROUS METALS AGAINST CORROSION

[75] Inventor: John Edward King, Perrysburg, Ohio

[73] Assignee: Master Chemical Corporation, Perrysburg, Ohio

[22] Filed: Oct. 23, 1970

[21] Appl. No.: 83,657

[52] U.S. Cl. ................ 252/33.4, 252/49.3, 252/395
[51] Int. Cl. ......................... C10m 1/54, C10m 1/40
[58] Field of Search ................... 252/49.3, 395, 33.4

[56] References Cited

UNITED STATES PATENTS

| | | | |
|---|---|---|---|
| 2,999,064 | 9/1961 | Sluhan | 252/49.3 X |
| 2,455,659 | 12/1948 | Duncan et al. | 252/395 X |
| 3,526,595 | 9/1970 | Pellaton | 252/49.3 X |
| 2,882,227 | 4/1959 | Lindberg | 252/395 X |

*Primary Examiner*—Daniel E. Wyman
*Assistant Examiner*—W. Cannon
*Attorney*—Marshall & Yeasting

[57] ABSTRACT

The aqueous cutting fluid consists essentially of a reaction product of boric acid with one to two molecular equivalents of an aliphatic amine having from one to three aliphatic radicals each of which contains from one to four carbon atoms, and having at least one hydroxy group attached to a carbon atom. Improved protection of ferrous metals against corrosion is provided by incorporating in the cutting fluid a petroleum sulfonate together with a non-ionic wetting agent.

5 Claims, No Drawings

3,719,598

AQUEOUS CUTTING FLUID WHICH PROTECTS FERROUS METALS AGAINST CORROSION

BACKGROUND OF THE INVENTION

An aqueous cutting fluid which has gone into extensive commercial use consists essentially of a reaction product of boric acid with an amine, as described in U.S. Pat. No. 2,999,064. That type of aqueous cutting fluid is stable and substantially transparent, and has a high lubricating action.

The amine borate in this type of aqueous cutting fluid inhibits corrosion of cast iron or steel, provided that the aqueous solution of the amine borate which is used as a cutting fluid is not too dilute. However, it is desirable to use the aqueous cutting fluid in the form of a highly dilute solution, for the sake of economy and in order to eliminate the danger of any deposits being formed upon a machine tool by partial evaporation of water from the aqueous cutting fluid during a machining operation.

SUMMARY OF THE INVENTION

The present invention is based upon the discovery that an aqueous cutting fluid of the amine borate type described in U.S. Pat. No. 2,999,064 can be used in a highly dilute form without causing corrosion of cast iron or steel if a petroleum sulfonate is incorporated in the aqueous cutting fluid. In accordance with the invention a non-ionic wetting agent is also incorporated in order to hold the petroleum sulfonate in dispersion in the aqueous cutting fluid by reducing its substantivity to the metal and graphite chips, which would otherwise carry it out of the solution. The incorporation of these two ingredients in combination gives a very desirable level of surface activity.

It has been found that excellent results are obtained in the practice of the invention when the aqueous cutting fluid is used in highly dilute form. The use of the aqueous cutting fluid in highly dilute form is advantageous because of the reduced cost of the ingredients and because of the reduced tendency of the cutting fluid to form any deposits upon a machine tool as a result of partial evaporation of the water from the cutting fluid.

Another important advantage of using the aqueous cutting fluid of the invention, with its optimized surface activity, is that the fine particles of graphite which are produced in the machining of cast iron will neither float on top of the coolant creating a messy, difficult to remove semi-solid layer, nor disperse so thoroughly in the coolant that it becomes opaque like ink; instead, the graphite particles separate from the present cutting fluid by gravity so that they can be readily removed in order to regenerate a clean cutting fluid which does not hide the work.

The present invention, as hereinbefore explained, makes it possible to use the cutting fluid in highly dilute form, and the use of a highly dilute cutting fluid is essential in order to enable the graphite particles to settle out. If in any case the graphite tends to float on top of the coolant, the operator can increase the concentration of the present cutting fluid slightly to correct this condition.

Although an aqueous cutting fluid embodying the invention provides rapid settling of graphite particles, it has a strong dispersing action upon the metal debris and upon the lime soaps which are formed from hard water, and holds the metal debris and lime soaps in suspension so as to minimize or prevent clogging of pipe lines and filters which are used to conduct and to regenerate the aqueous cutting fluid.

An aqueous cutting fluid embodying the invention, which provides superior protection of ferrous metals against corrosion, consists essentially of a reaction product of boric acid with one to two molecular equivalents of an aliphatic amine having one to three aliphatic radicals each of which contains from one to four carbon atoms and having at least one hydroxy group attached to a carbon atom, together with a petroleum sulfonate of such an amine or an alkali metal, in an amount from 3 to 15 percent of the solids content of the cutting fluid, and a non-ionic wetting agent in an amount from 0.5 to 3 percent of the solids content.

An aqueous cutting fluid embodying the invention may be prepared by mixing the boric acid, the amine and the other ingredients at ordinary temperatures.

Boric Acid

The boric acid used in preparing an aqueous cutting fluid of the invention may consist of ordinary boric acid, or may be provided by incorporating any other boron compound that forms boric acid upon being dissolved in water, such as metaboric acid or boric oxide. It is believed that the boric acid forms an addition product or salt with the amine which is a syrupy liquid and does not precipitate out of the cutting fluid.

Amine

The aliphatic amines which can be used in preparing a cutting fluid of the invention, each of which has from one to three aliphatic radicals each containing from one to four carbon atoms, and has at least one hydroxy group attached to a carbon atom, include primary, secondary and tertiary alkylol amines such as mono-, di- or triethanolamine. These amines are water soluble and have no offensive odor. The preferred amine for use in preparing the cutting fluid of the invention is triethanolamine, which ordinarily contains minor amounts of mono- or diethanolamine, and has no odor.

Petroleum Sulfonate

The petroleum sulfonate may be a potassium or amonium salt, or a salt of any of the amines hereinbefore described, but preferably is a sodium salt. A typical sodium petroleum sulfonate has a sulphur trioxide content between 17 and 18 percent and has a molecular weight from 440 to 470. It is usually employed in the form of a 62 percent solution in mineral oil, having a water content of about 4 percent.

Non-Ionic Wetting Agent

The non-ionic wetting agent used in an aqueous cutting fluid embodying the invention may be any desired non-ionic wetting agent, such as a condensation product of ethylene oxide; a condensation product of a fatty body or derivative, such as a derivative of a fatty acid, fatty alcohol, fatty amide or fatty amine, with ethylene oxide; and a reaction product obtained by the condensation of an oxyalkylaryl compound, such as a derivative of an alkylphenol or alkylnaphthol, with ethylene oxide. It is preferable that the non-ionic wetting agent employed be water soluble. Typical non-ionic wetting agents include the polyethoxyesters of fatty acids, the monooleate of a polyethylene glycol, the monolaurate of a polyethylene glycol, the polyethoxyethers of fatty alcohols, the condensation product of an alkylphenol such as dodecyl phenol with 12 moles of ethylene oxide, and the sulfonated product of the condensation of an alkylphenol or an alkylnaphthol with ethylene oxide. A particularly useful non-ionic wetting agent is an alkyl phenoxy polyethoxy ethanol such as octyl or nonyl phenoxy polyethoxy ethanol.

Other Ingredients Which May Be Used

An aqueous cutting fluid embodying the invention gives excellent results in applications in which the pressure per unit of area is relatively low, such as surface grinding operations in which a large surface is being ground or in which a number of pieces are being ground simultaneously. For heavy-duty applications, in which the pressure per unit of area is relatively high, an aqueous cutting fluid embodying the invention preferably contains, in addition to the reaction product of boric acid and the aliphatic amine, a reaction product of such an amine and a fatty acid having from 18 to 22 carbon atoms in which any substituent consists of a single hydroxy group. For extremely heavy duty applications, a sulfurized fatty acid may be used. Such a reaction product is considered to be a salt of the amine with the fatty acid, and may be present in an amount from 3 to 30 percent of the solids content of the aqueous cutting fluid.

The term "solids content of the aqueous cutting fluid" as used herein refers to all ingredients of the aqueous cutting fluid other than water.

The fatty acids whose amine salts may be used in the practice of the invention include saturated fatty acids such as stearic acid, as well as unsaturated fatty acids such as oleic, linoleic, elaidic, linolenic, erucic and eleostearic acids. Ricinoleic acid also may be used, but the preferred fatty acid is an unsubstituted unsaturated fatty acid having 18 carbon atoms, such as oleic acid.

The fatty acid salt may be a salt of any of the aliphatic amines hereinbefore described, but preferably is a salt of triethanolamine.

Often it is desirable to add an alkali metal nitrite, such as sodium nitrite, in an amount from 1 percent to 10 percent of the total solids content of the aqueous cutting fluid, to counteract the corrosive effects of dissolved salts.

Other ingredients which may be incorporated in the aqueous cutting fluid include silicone anti-foaming agents, bactericides, and metal deactivators such as sodium mercaptobenzothiazole.

Preparation of Cutting Fluid

In the preparation of an aqueous cutting fluid embodying the invention, the ingredients are mixed at ordinary temperatures to produce a water-miscible fluid. The minimum amount of water necessary to be mixed with the other ingredients in order to produce a concentrate which is stable at temperatures from −20° F to 140° F is usually an amount equal to 40 to 60 percent by weight of the total mixture.

An aqueous cutting fluid embodying the invention may be either in the form of a "concentrate," which contains only the minimum amount of water required to form a stable liquid, or in the form of a fluid which has been diluted with water for use in metal-working operations. An aqueous cutting fluid embodying the invention is usually manufactured and shipped in the form of a concentrate, and the user adds water to dilute the aqueous cutting fluid to the desired working concentration. When the concentrate has been diluted ready for use, the concentration of the ingredients other than water may be from 1 to 3 percent by weight, but preferably is between 1 and 2 percent.

The ingredients which form an aqueous cutting fluid embodying the invention may be mixed in any desired order, but it is usually convenient to mix the major ingredients to form a liquid of relatively large bulk with which the minor ingredients may be readily mixed. Thus the boric acid, preferably in finely divided form to facilitate solution, may be mixed with the water and the amine by stirring at room temperature until the boric acid is dissolved. Although the number of moles of the amine used may be equal to the number of moles of boric acid, it is desirable to use an excess of the amine which may be as great as 100 percent, but preferably is between 10 and 30 percent.

When an amine salt of a fatty acid is used as hereinbefore described, it may be added to the solution prepared from the boric acid and the amine and may be mixed at room temperature. Also, the free fatty acid may be added slowly at room temperature, with stirring, to the aqueous solution prepared from the boric acid and the amine. In this case, the aqueous solution should contain an additional amount of the amine which is the molecular equivalent of the amount of the fatty acid. The reaction of the fatty acid with the amine to form a salt usually is completed in about 3 hours at room temperature. When the amine is triethanolamine, addition of free oleic acid in this manner results in a cutting fluid containing triethanolamine borate and triethanolamine oleate.

A petroleum sulfonate and a non-ionic wetting agent also may be added at room temperature, with stirring, to the aqueous solution prepared from boric acid and the amine. Preferably the amount of the non-ionic wetting agent is at least 5 percent by weight of the amount of the petroleum sulfonate. When an amine salt of a fatty acid is incorporated in the cutting fluid, the amount of the non-ionic wetting agent may be as much as 30 percent by weight of the amount of the petroleum sulfonate, in order to hold the salt of the fatty acid in solution and to prevent the precipitation of a lime soap when the concentrate is diluted with hard water.

An aqueous cutting fluid embodying the invention is a stable liquid which has a high lubricating action, is not irritating to the skin, and inhibits corrosion of common metals, notably cast iron and steel.

Example 1

A mixture of triethanolamine (36 parts), boric acid (13 parts), sodium mercaptobenzothiazole (0.1 part) and water (50 parts) is stirred at room temperature. As soon as a clear solution is formed, addition of a sodium petroleum sulfonate and a non-ionic wetting agent is carried out with continued stirring. The sodium petroleum sulfonate which is added is in the form of 4.0 parts of a composition consisting of 62 percent by weight of a sodium petroleum sulfonate having a sulfur trioxide content of 17.5 percent and a molecular weight between 440 and 470, 34 percent of mineral oil and 4 percent of water. The non-ionic wetting agent which is added consists of 0.4 part of Triton X-100, which is an octylphenoxy polyethoxy ethanol which contains approximately 10 ethylene oxide residues for each phenyl radical. An aqueous cutting fluid which does not produce rusting of steel may be prepared by diluting 3 parts by weight of the concentrate obtained as hereinbefore described with 100 parts of water. The aqueous cutting fluid thus prepared gives excellent results in applications in which the pressure per unit of area is relatively low. The aqueous cutting fluid so prepared, when used for the machining of cast iron, does not hold the graphite particles in suspension, but causes the graphite particles to become wet and to settle out of the aqueous cutting fluid so that they are easily removed to regenerate a clear cutting fluid.

When a control concentrate is prepared by a procedure which is the same as that hereinbefore described except that the sodium petroleum sulfonate and the non-ionic wetting agent are omitted, 3 parts by weight of the control concentrate can be diluted with only 50 parts instead of 100 parts of water, in order to avoid rusting of steel. Also, when 3 parts by weight of a control concentrate are diluted with only 50 parts of water, the resulting cutting fluid tends to hold graphite particles in suspension, so that after being used to machine cast iron the cutting fluid prepared from the control concentrate becomes permanently opaque and ink-like. The opaque cutting fluid, when reused in a machining operation, makes it difficult for the operator to observe the work during the machining operation.

Example 2

A mixture of triethanolamine (28 parts), boric acid (9 parts), sodium mercaptobenzothiazole (0.15 part), potassium nitrite (2.5 parts of a 55 percent aqueous solution) and water (53 parts) is stirred at room temperature until a clear solution is obtained. Oleic acid (4.5 parts) is then added slowly over a period of 1 hour with stirring. The resulting composition is then allowed to stand at room temperature for 3 hours, and a non-ionic wetting agent (1.3 parts of Triton X-100) is added together with 0.1 part of a silicone anti-foaming agent. A sodium petroleum sulfonate composition (5 parts of the composition used in Example 1, containing 62 percent of a sodium petroleum sulfonate) is then added with stirring. The concentrate thus prepared (3 parts by weight) may be diluted with 100 parts by weight of water to produce a general-purpose cutting fluid which has excellent lubricating properties and provides excellent protection against corrosion of common metals. Lime soaps which are formed from hard water are held in suspension by this aqueous cutting fluid so as to prevent clogging of pipelines through which the fluid is conducted.

When a control concentrate is prepared by a procedure which is the same as the foregoing procedure except that the sodium petroleum sulfonate is omitted, an aqueous cutting fluid may be prepared by diluting 3 parts by weight of the control concentrate with 100 parts of water. However, the aqueous cutting fluid thus prepared from the control concentrate causes appreciable rusting of cast iron.

Example 3

Ordinary city water containing 35 parts per million of sodium chloride and 8 grains per gallon of hardness was evaporated to ½ of its volume, in order to increase its mineral content to twice the normal amount. The water so prepared was used in the tests described in this example and in Example 4, because an aqueous cutting fluid in normal use also contains approximately twice the normal content of minerals, because of the increased mineral content which is reached at equilibrium under the combined effects of evaporation of water from the cutting fluid, loss of cutting fluid entrained by the chips and other debris, and addition of fresh cutting fluid and water to compensate for the losses. One part by weight of a control concentrate prepared substantially as described in Example 1 was added to 100 parts of the water to prepare a 1 percent solution of the control concentrate. Solutions of 2 percent, 3 percent and 4 percent of the control concentrate were prepared in a similar manner by adding 2, 3, or 4 parts by weight of the control concentrate to 100 parts of the prepared water.

A sample of each of these solutions so prepared was poured into a test tube containing a clean strip of steel about 1 inch long, the amount of solution being such that the strip was about ¾ submerged. Each test tube was then stoppered, shaken to wet the strip of steel thoroughly, and then held for 1 week at 60° C. At the end of this test, each of the four strips of steel was found to be definitely rusted. The same procedure was then repeated, using four clean strips of steel, but in this case 2 parts by weight of the sodium petroleum sulfonate used in Example 1 were added to 100 parts of the control concentrate before the control concentrate was used to prepare the four solutions containing from one to 4 per cent by weight of the concentrate. At the end of one week at 60° C, the four strips of steel were found to be still clean and free from rust. This improved result was due to the presence of the sodium petroleum sulfonate, in combination with the boric acid salt of triethanolamine. The non-ionic wetting agent used in the practice of the invention has no appreciable effect upon the corrosion of ferrous metals, but has been found to have an important effect in preventing the sodium petroleum sulfonate from being carried away rapidly with the chips.

Example 4

A solution was prepared by adding 4 parts by weight of a control concentrate substantially identical with that described in Example 2 to 100 parts of the water used in Example 3, to produce a 4 percent test solution. Then after 10 grams of clean, dry cast iron chips had been placed in a 50 ml. glass beaker, a pipette was used to add 2 ml. of the 4 percent test solution to the chips. The chips were then stirred until uniformly moistened with the solution. A circular piece of filter paper about 5.5 centimeters in diameter was placed in a Petri dish cover, and the wet chips were poured onto the filter paper. With the chips arranged in an even layer on the filter paper, the sample was allowed to stand exposed to the air at room temperature for 24 hours. The sample was then examined and it was found that appreciable rusting had taken place, leaving noticeable rust spots on the filter paper. Another such test was then carried out by a procedure which was the same except that the concentrate used was modified by mixing 100 parts of the concentrate with 5 parts by weight of the sodium petroleum sulfonate described in Example 1. At the end of the 24 hour period, it was found that no substantial rusting of the chips had occurred, indicating that rusting of the cast iron chips was substantially prevented by the presence of the sodium petroleum sulfonate in the solution.

I claim:

1. In an aqueous cutting fluid which provides superior protection of ferrous metals against corrosion, consisting essentially of a reaction product of boric acid with from one to two molecular equivalents of a hydroxy-substituted alkyl amine having from one to three aliphatic radicals each of which contains from one to four carbon atoms, and having at least one hydroxy group attached to a carbon atom, the improvement comprising a petroleum sulfonate in an amount from 3 to 15 percent of the solids content, and a nonionic wetting agent in an amount from 0.5 to 3 percent of the solids content.

2. An aqueous cutting fluid according to claim 1 wherein the amine is triethanolamine.

3. An aqueous cutting fluid according to claim 1 comprising an alkali metal nitrite in an amount from 1 to 10 percent of the solids content.

4. An aqueous cutting fluid according to claim 1 comprising a salt of triethanolamine with a fatty acid having from 18 to 22 carbon atoms in which any substituent consists of a single hydroxy group, in an amount from 3 to 30 percent of the solids content.

5. An aqueous cutting fluid according to claim 3 wherein the fatty acid is an unsubstituted unsaturated fatty acid having 18 carbon atoms.

* * * * *